US008543121B2

(12) United States Patent
Ryan

(10) Patent No.: US 8,543,121 B2
(45) Date of Patent: Sep. 24, 2013

(54) SYSTEMS AND METHODS FOR USAGE-BASED RADIO RESOURCE MANAGEMENT OF SELF-OPTIMIZING CELLS

(75) Inventor: David J Ryan, Seattle, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 664 days.

(21) Appl. No.: 12/710,242

(22) Filed: Feb. 22, 2010

(65) Prior Publication Data

US 2010/0216477 A1  Aug. 26, 2010

Related U.S. Application Data

(60) Provisional application No. 61/155,043, filed on Feb. 24, 2009.

(51) Int. Cl.
*H04W 72/00* (2009.01)

(52) U.S. Cl.
USPC ........ 455/450; 455/446; 455/405; 455/452.1; 455/453

(58) Field of Classification Search
USPC .......................................... 455/446–454, 405
See application file for complete search history.

(56) References Cited

U.S. PATENT DOCUMENTS

| | | | |
|---|---|---|---|
| 6,125,278 A | 9/2000 | Wieczorek et al. | |
| 6,223,041 B1 | 4/2001 | Egner et al. | |
| 6,850,764 B1* | 2/2005 | Patel | 455/450 |
| 2004/0192341 A1 | 9/2004 | Wang et al. | |
| 2006/0014543 A1* | 1/2006 | Drakos | 455/450 |
| 2008/0068979 A1 | 3/2008 | Visotsky et al. | |
| 2010/0184431 A1* | 7/2010 | Kent et al. | 455/435.1 |

OTHER PUBLICATIONS

International Search Report and Written Opinion for PCT/US2010/024953 filed on Feb. 22, 2010.

* cited by examiner

*Primary Examiner* — Steven Lim

(57) ABSTRACT

Systems and methods are described for allocating frequency resources based on historical usage data in a wireless communication system. A base station tracks its local usage pattern to generate a set of historical usage statistics. The base station may share those statistics with another base station node in the same network and with a server. The server may generate a frequency resource allocation plan to allocate shared resources most efficiently to various base stations based on historical usage information. Allocating frequency resources in this manner reduces the probability of cochannel interference between nearby cells and optimizes power solutions for local and regional radio access networks.

17 Claims, 10 Drawing Sheets

SYSTEMS AND METHODS FOR USAGE-BASED RADIO RESOURCE MANAGEMENT OF SELF-OPTIMIZING CELLS

CROSS REFERENCE TO RELATED APPLICATIONS

The present application claims the benefit of U.S. Provisional Application No. 61/155,043, filed Feb. 24, 2009.

FIELD OF THE INVENTION

The field of the present invention generally relates to systems and method for self-optimizing radio resources in radio access nodes. The self-optimization process allocates resources such as wireless communication frequencies and/or channels efficiently based on actual historical usage to balance long-term optimization and reaction speed to exceptions.

BACKGROUND OF THE INVENTION

Today, an increasing number of readily deployable wireless transceiver devices (e.g., femtocell and picocell base stations), operating on licensed frequency spectra, are being utilized by network subscribers within the coverage areas of larger wireless network cells (e.g., macrocell and microcell base stations) to improve the quality and/or capacity of wireless communications for various subscriber site locations. Smaller cells play an increasingly significant role in reducing metropolitan and residential area traffic experienced by larger, often overburdened, network cells. These transceiver devices may be distributed in such a way as to provide short-range wireless communications services to single-family homes, public businesses (e.g., such as Starbucks® coffee shops or McDonalds® restaurants), to particular floors within an office building, or any other public or private entity location desiring improved and/or localized cellular service.

As would be understood by those skilled in the Art, in wireless service provider networks, macrocells typically provide the largest wireless coverage area for licensed frequency spectra, followed by microcells, then picocells, and lastly femtocells, which provide the smallest coverage area of the common network cell types. By way of example, in a typical wireless data communications network, a macrocell base station may provide a wireless coverage area ranging between one to five kilometers, radially from the center of the cell; a microcell base station may provide a coverage area ranging between one-half to one kilometer radially; a picocell base station may provide a coverage area ranging between 100 to 500 meters radially; and a femtocell base station may provide a coverage area of less than 100 meters radially. Each of these network cells or base station types is generally configured to connect with a particular service provider network using various common wireline communications technologies, including, but not limited to: fiber optic, DSL, powerline, and/or coaxial cable (i.e., joining cells to a backhaul network).

The fundamental and reciprocal relationship between cell coverage area and data throughput for a given amount of radio spectrum and signal energy drives modern high throughput networks towards these small coverage footprint microcells, picocells, and femtocells. Thus, it is anticipated that with the evolution of next generation wireless communications (e.g., with 4G wireless communications deployment), smaller cells (also referred to herein as "transceiver devices") may eventually be the predominant service providing instruments utilized in most heavily populated geographic regions of a wireless network. In this developing scenario, groups of smaller cells may be collectively viewed as "layers" of cells that supply the lion's share of a particular service provider's network capacity, whereas the network's larger cells may be primarily responsible for providing overarching coverage to the underlying intra-network of smaller cells, in order to facilitate service continuity between smaller cells and amongst cells and cell layers.

These cell layers and smaller cells can reduce periods of network congestion created by traditional network architecture which bottlenecked a majority of regional subscriber communications through a small number of larger network cells (e.g., macrocells or microcells). This congestion reducing technique can improve a service provider network's Quality of Service (QOS) as well as network service subscribers' collective Quality of Experience (QOE) within a particular portion of a data communications network. Negative effects associated with poor QOS and poor QOE (e.g., conditions largely caused by congestion and/or interference), which can be mitigated by adding a substantial number of short-range wireless transceiver devices to network infrastructure, may include: queuing delay, data loss, as well as blocking of new and existing network connections for certain network subscribers.

As the number of layers in a network increases (i.e., the number of macrocells, microcells, picocells, and femtocells in a network), it become increasingly important to manage the frequency resources shared by the components in a network. By way of example, cells with overlapping coverage areas might share a fixed number of wireless communication channels, e.g., 100 channels. A radio access node may require more resources depending on the time of day, geographic location, node size, etc. Thus it would be desirable to allocate resources most efficiently depending on the usage demand.

Prior art solutions include developing static channel assignments and dynamic channel assignments. Typical static channel assignment algorithms must err on the conservative side to reduce the probability of cochannel interference between neighboring access nodes. This can lead to conditions where too few or too many channels are pre-provisioned to a set of radio access nodes, and the system may not react quickly to exception scenarios. Typical dynamic channel assignment processes must similarly pre-provision a pool of applicable channels based on broad assumptions of local traffic patterns. In the case of large coverage area macrocells, this sort of statistical pre-provisioning, while not optimal, can work based on the large area and number of users served. Statistical pre-provisioning falls apart without sufficiently high population and diversity of uncorrelated users. Small footprint microcell, picocell, and femtocell radio access nodes will provide coverage over much smaller service regions and they will service fewer users per cell. As a result, it would be difficult if not impossible to efficiently incorporate an individual user's home transceiver device into a dynamic channel assignment.

The smaller coverage areas provided by these high throughput cells (e.g., microcells, picocells, and femtocells) are expected to exhibit strong usage patters as a function of geographical location and time of day as well as similar usage patterns over week-long and longer time periods. By way of example, a small cell site (e.g., a microcell, picocell, or femtocell) serving a metropolitan train station may be heavily loaded during commute hours as commuters wait for trains but then may remain relatively lightly loaded during other hours. Similarly, a picocell or femtocell serving an office building may be lightly loaded during a commute hour but would remain heavily loaded throughout the working hours. Thus, there is a need for a frequency resource allocation method that takes into account local and actual traffic patterns to predict future needs and to serve as an input to an automated radio resource management algorithm.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with traditional methods for allocating frequency resources, a self-optimizing system, method of adjusting the system, and a self-optimizing radio access node includes, but is not limited to, allocating frequency resources based on historical usage pattern information in a radio access node.

The present invention may include a networked computing system utilizing historical usage information for optimizing communications resources, comprising: a first transceiver device; a second transceiver device; one or more user equipment; a server computer; and a data communications network facilitating data communication amongst the first transceiver device, the second transceiver device, the at least one user equipment, and the server computer, wherein the first transceiver device is configured to: track a local access node usage pattern to generate a first set of usage pattern metrics; receive a frequency resource allocation plan; and allocate at least one frequency resource based at least in part on the first set of usage pattern metrics and the frequency resource allocation plan.

In accordance with another aspect of the present invention, the first transceiver device in the system is further configured to share the first set of usage pattern metrics with the second transceiver device and with the server computer.

In accordance with another aspect of the present invention, the server computer is configured to generate the frequency resource allocation plan based on historical usage data received from the first transceiver device and the second transceiver device.

In accordance with another aspect of the present invention, the first set of usage pattern metrics is selected from the group consisting of: daily peak and mean usage times; typical mean and peak channel data bandwidth utilization per session; and typical mean and peak number of simultaneous active sessions.

In accordance with another aspect of the present invention, the frequency resource allocation plan is generated dynamically based on actual historical usage patterns of the first transceiver and the second transceiver.

In accordance with another aspect of the present invention, the first transceiver device in the system is further configured to: receive a second set of usage pattern metrics from the second transceiver device; predict a probability of cochannel interference based on the first set of usage pattern metrics and the second set of usage pattern metrics; and determine a preferred channel list based on the predicted probability.

In accordance with another aspect of the present invention, the first transceiver device in the system is selected from the group of a microcell, a picocell, and a femtocell, and wherein the second transceiver device is selected from the group of a macrocell, a microcell, a picocell, and a femtocell.

The present invention may further include a computer-implemented method for allocating at least one frequency resource based on historical usage data, the method comprising: tracking a local access node usage pattern to generate a first set of usage pattern metrics at a first transceiver in a network; receiving a frequency resource allocation plan; and allocating the at least one frequency resource based at least in part on the first set of usage pattern metrics and the frequency resource allocation plan.

In accordance with another aspect of the present invention, the method further comprises sharing the first set of usage pattern metrics with a second transceiver device and with a server computer.

In accordance with another aspect of the present invention, the method further comprises generating the frequency resource allocation plan based on historical usage data received from the first transceiver device and a second transceiver device at a server computer.

In accordance with another aspect of the present invention, method includes selecting the first set of usage pattern metrics from the group consisting of: daily peak and mean usage times; typical mean and peak channel data bandwidth utilization per session; and typical mean and peak number of simultaneous active sessions.

In accordance with another aspect of the present invention, the method includes generating the frequency resource allocation plan dynamically based on actual historical usage patterns of the first transceiver and a second transceiver.

In accordance with another aspect of the present invention, the method further comprises: receiving at the first transceiver device a second set of usage pattern metrics from a second transceiver device; predicting a probability of cochannel interference based on the first set of usage pattern metrics and the second set of usage pattern metrics; and determining a preferred channel list based on the predicted probability.

In accordance with a further aspect of the present invention is a computer-readable medium comprising computer-executable instructions for allocating at least one frequency resource based on historical usage data, which when executed, performs the method comprising: tracking a local access node usage pattern to generate a first set of usage pattern metrics at a first transceiver in a network; receiving a frequency resource allocation plan; and allocating the at least one frequency resource based at least in part on the first set of usage pattern metrics and the frequency resource allocation plan.

In accordance with a further aspect of the present invention is a transceiver device for utilizing historical usage information for optimizing communications resources, comprising: at least one memory; at least one processor operatively coupled to the memory, wherein the transceiver device is configured to: track a local access node usage pattern to generate a first set of usage pattern metrics; receive a frequency resource allocation plan; and allocate at least one frequency resource based at least in part on the first set of usage pattern metrics and the frequency resource allocation plan.

BRIEF DESCRIPTION OF THE DRAWINGS

Preferred and alternative examples of the present invention are described in detail below by way of example and with reference to the drawings, in which.

DETAILED DESCRIPTION

Figure 1:
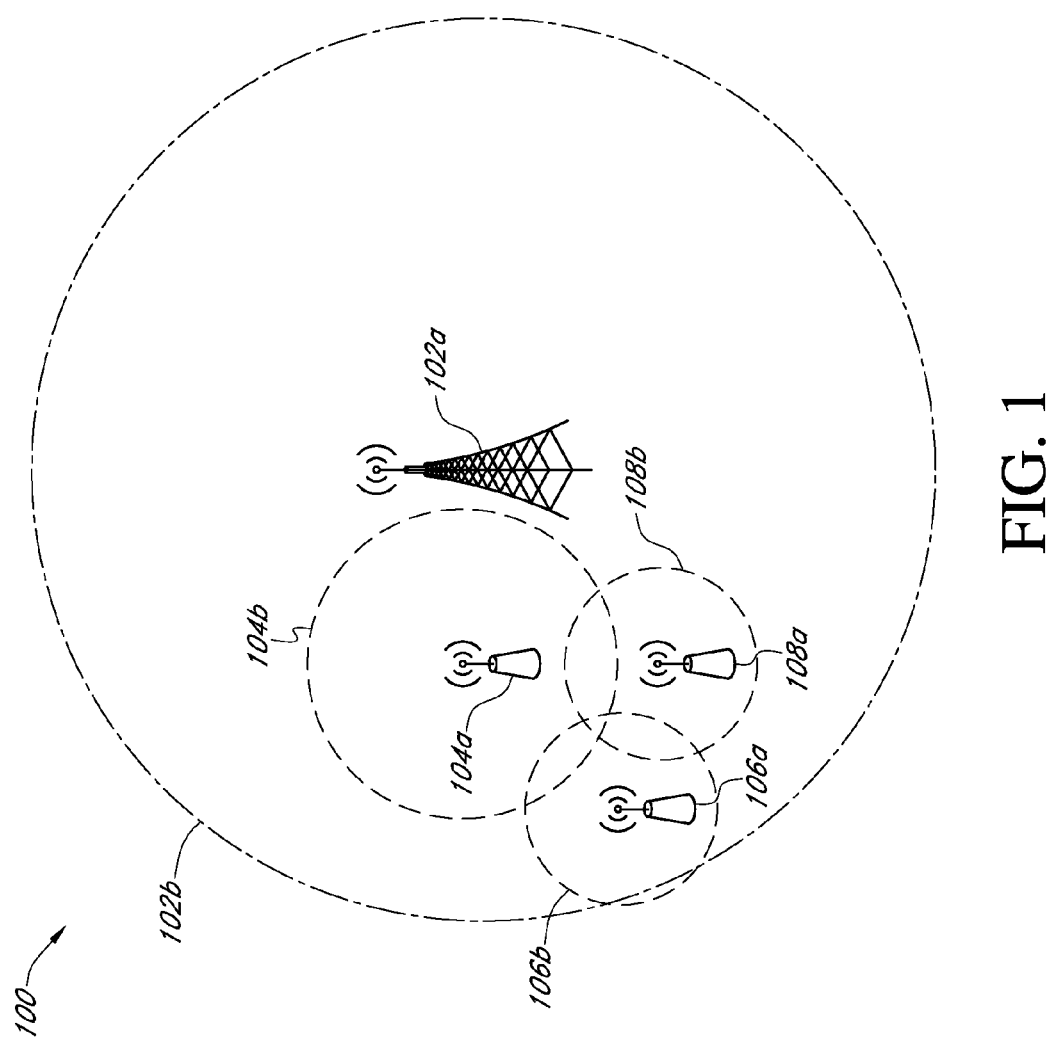
FIG. 1 illustrates a network topology comprising various base stations as a part of a larger data communications network in accordance with an embodiment of the present invention.

In accordance with an exemplary embodiment of the present invention, FIG. 1 illustrates a generic cell topology 100 depicting cell coverage regions resulting from extemporaneous deployment methodology. The generic cell topology 100 may include, but is not limited to, one or more macrocell base stations 102a with a corresponding coverage area 102b, and one or more intermediate-coverage base stations 104a such as a microcell or picocell base station with a corresponding coverage area 104b. Generic cell topology 100 further includes several femtocell base stations 106a and 108a each with a corresponding coverage area 106b and 108b. Cell coverage areas 102b, 104b, 106b, and 108b overlap in varying degrees according to their placement in the generic cell topology 100. This tightly knit cell topology necessitates a frequency allocation plan which is addressed by the present invention.

In accordance with various embodiments of the present invention, a wide-area or wide-range base station (e.g., base station 102a) may be considered to be any of a macrocell, a microcell, or a picocell base station, depending on the reference coverage area provided by the small-area or short-range wireless transceiver device(s) (e.g., a femtocell or a picocell device) to which the base station coverage area is being compared. Similarly, in accordance with various embodiments of the present invention, a small-area or short-range wireless transceiver device (e.g., base stations 104a, 106a, and 108a) may be considered to be either a femtocell (e.g., a short-range base station device such as a Home eNodeB), a picocell, or a microcell, depending on the reference coverage area provided by neighboring wider coverage area base stations (e.g., macrocell, microcell, or picocell base stations) to which the transceiver device coverage area is being compared.

Figure 2:
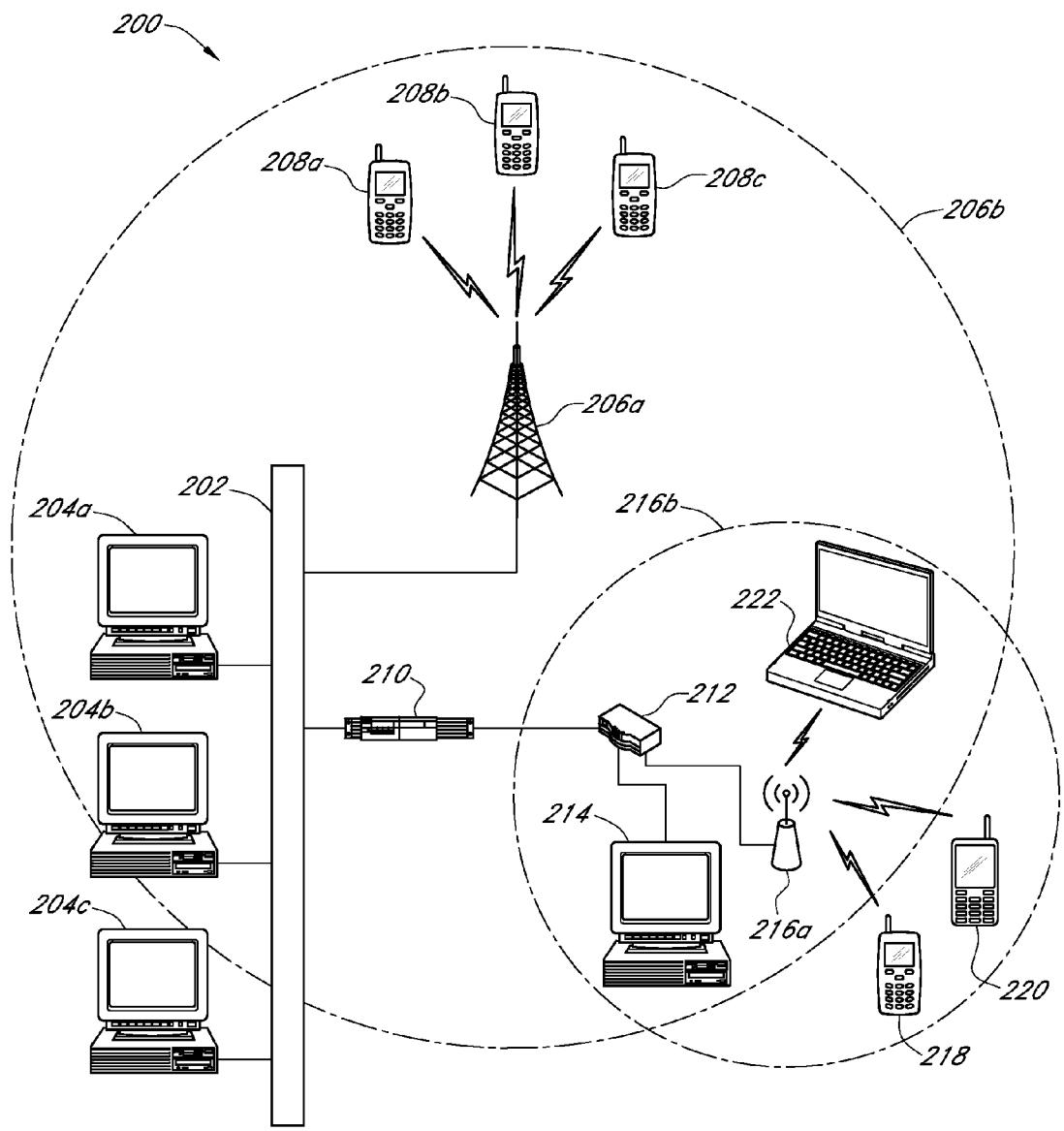
FIG. 2 illustrates a perspective view of a networked computing system in accordance with an embodiment of the present invention.

FIG. 2 illustrates a perspective view of a networked computing system 200 including various wireline and wireless computing devices that may be utilized to implement any of the frequency resource allocation processes associated with various embodiments of the present invention. The networked computing system 200 may include, but is not limited to, one or more remote base station devices 206a, which may be associated with a macrocell, a microcell, or a picocell base station that may be a neighboring base station to one or more short-range transceiver devices 216a (e.g., a femtocell or picocell device) within a particular region of the networked computing system 200; a group of remote service provider devices 204a-c, including server computers or any other common network device known in the art such as routers, gateways, or switch devices, which can support network resource allocation and/or digital data communication services to various network subscriber computing devices (e.g., any of the devices 208a-c, 210, 212, 214, 216a, 218, 220, and 222); a data communications network 202, including both Wide Area Network 206b (WAN), and Local Area Network 216b (LAN) portions; a variety of wireless user equipment, including: cellular phone or PDA devices 208a-c, 218 and 220, and a laptop or netbook computer 222, along with any other common portable wireless computing devices well known in the art (e.g., handheld gaming units, personal music players, video recorders, electronic book devices, etc.) that are capable of communicating with the data communications network 202 utilizing one or more of the remote base stations 206a, the short-range transceiver device 216a, or any other common wireless or wireline network communications technology; one or more network gateways or switch devices 210 and router 212 that can facilitate data communications processes within the LAN and between the LAN and the WAN of the data communications network 202; and a desktop computer 214 optionally connected to the LAN.

In an embodiment, remote base station 206a may be representative of the base station 102a in FIG. 1, while the short-range transceiver device 216a may be representative of the base stations 104a, 106a, and 108a in FIG. 1. FIG. 2 only illustrates one short-range transceiver device 216a, although it may be apparent that the networked computing system 200 may include any number of base stations similar to the topology in FIG. 1.

In an embodiment, the remote base station 206a, the short-range transceiver device 216a (e.g., a femtocell or picocell base station), the remote service provider devices 204a-c, or any of the user equipment (e.g., 208a-c, 214, 218, 220, or 222) may be configured to run any well-known operating system, including, but not limited to: Microsoft® Windows®, Mac OS®, Google® Chrome®, Linux®, Unix®, or any well-known mobile operating system, including Symbian®, Palm®, Windows Mobile®, Google® Android®, Mobile Linux®, MXI®, etc. In an embodiment, the remote base station 206a may employ any number of common server, desktop, laptop, and personal computing devices.

In an embodiment, the user equipment (e.g., 208a-c, 214, 218, 220, or 222) may include any combination of common mobile computing devices (e.g., laptop computers, netbook computers, cellular phones, PDAs, handheld gaming units, electronic book devices, personal music players, MiFi™ devices, video recorders, etc.), having wireless communications capabilities employing any common wireless data commutations technology, including, but not limited to: GSM™, UMTS™, LTE™, LTE Advanced™, Wi-Max™, Wi-Fi™, etc.

In an embodiment, either of the LAN or the WAN portions of the data communications network 202 of FIG. 2 may employ, but are not limited to, any of the following common communications technologies: optical fiber, coaxial cable, twisted pair cable, Ethernet cable, and powerline cable, along with any wireless communication technology known in the art. In an embodiment, the remote wireless base station 206a, the wireless user equipment (e.g., 208a-c, 218, 220, or 222), as well as any of the other LAN connected computing devices (e.g., 210, 212, or 214) may include any standard computing software and hardware necessary for processing, storing, and communicating data amongst each other within the networked computing system 200. The computing hardware realized by any of the network computing system 200 devices (e.g., 204a-c, 206a, 208a-c, 210, 212, 214, 216a, 220, or 222) may include, but is not limited to: one or more processors, volatile and non-volatile memories, user interfaces, transcoders, modems, and wireline and/or wireless communications transceivers, etc.

Further, any of the networked computing system 200 devices (e.g., 204a-c, 206a, 208a-c, 210, 212, 214, 216a, 220, or 222) may be configured to include one or more computer-readable media (e.g., any common volatile or non-volatile memory type) encoded with a set of computer readable instructions, which when executed, performs a portion of any of the usage-based optimization processes associated with various embodiments of the present invention.

In an embodiment, user equipment (e.g., 208a-c, 218, 220, and 222) may simultaneously reside within the wireless communications coverage area 216b of the short-range transceiver device 216a as well as within the wireless communications coverage area 206b of the base station 206a, or the user equipment may reside in a single, non-overlapping area of LAN 216b or WAN 206b.

Figure 3:
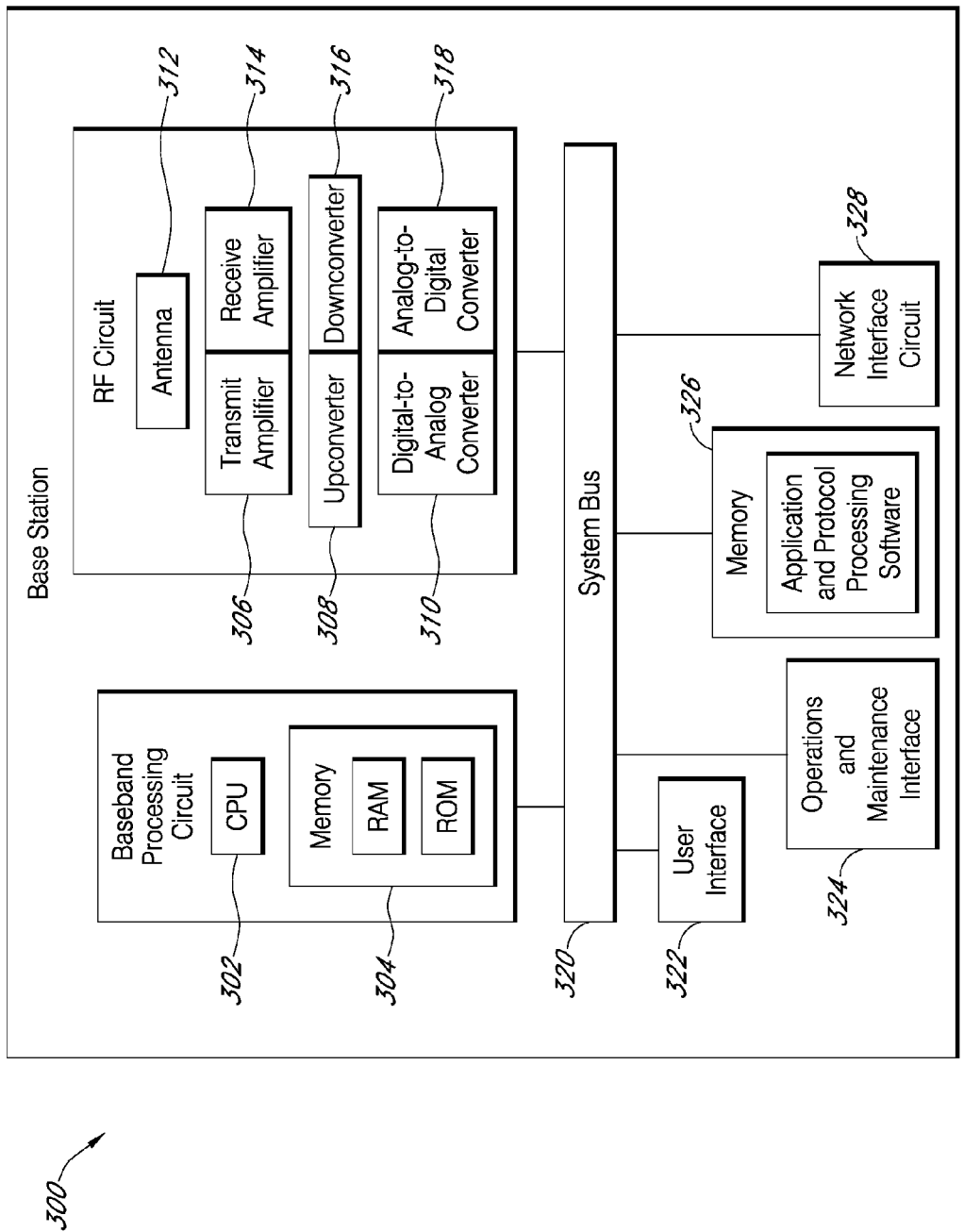
FIG. 3 illustrates a block diagram view of a base station in accordance with an embodiment of the present invention.

FIG. 3 illustrates a block diagram view of a base station device 300 (e.g., a femtocell or a picocell device) that may be representative of the base stations 106a and 108a in FIG. 1 and the short-range transceiver device 216a in FIG. 2. In accordance with an embodiment of the present invention, the base station device 300 may include, but is not limited to, a baseband processing circuit including at least one central processing unit (CPU) 302. In an embodiment, the CPU 302 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 302 is responsible for executing all computer programs stored on the transceiver device's 300 volatile (RAM) and nonvolatile (ROM) system memories, 304 and 326.

The base station device 300 may also include, but is not limited to, a radio frequency (RF) circuit for transmitting and receiving data to and from the network. The RF circuit may include, but is not limited to, a transmit path including a digital-to-analog converter 310 for converting digital signals from the system bus 320 into analog signals to be transmitted, an upconverter 308 for setting the frequency of the analog signal, and a transmit amplifier 306 for amplifying analog signals to be sent to the antenna 312. Further, the RF circuit may also include, but is not limited to, a receive path including the receive amplifier 314 for amplifying the signals received by the antenna 312, a downconverter 316 for reducing the frequency of the received signals, and an analog-to-digital converter 318 for outputting the received signals onto the system bus 320. The system bus 320 facilitates data communication amongst all the hardware resources of the base station device 300.

Further, the base station device 300 may also include, but is not limited to, a user interface 322; operations and maintenance interface 324; memory 326 storing application and protocol processing software; and a network interface circuit 328 facilitating communication across the LAN and/or WAN portions of the data communications network 202 (i.e., a backhaul network).

Figure 4:
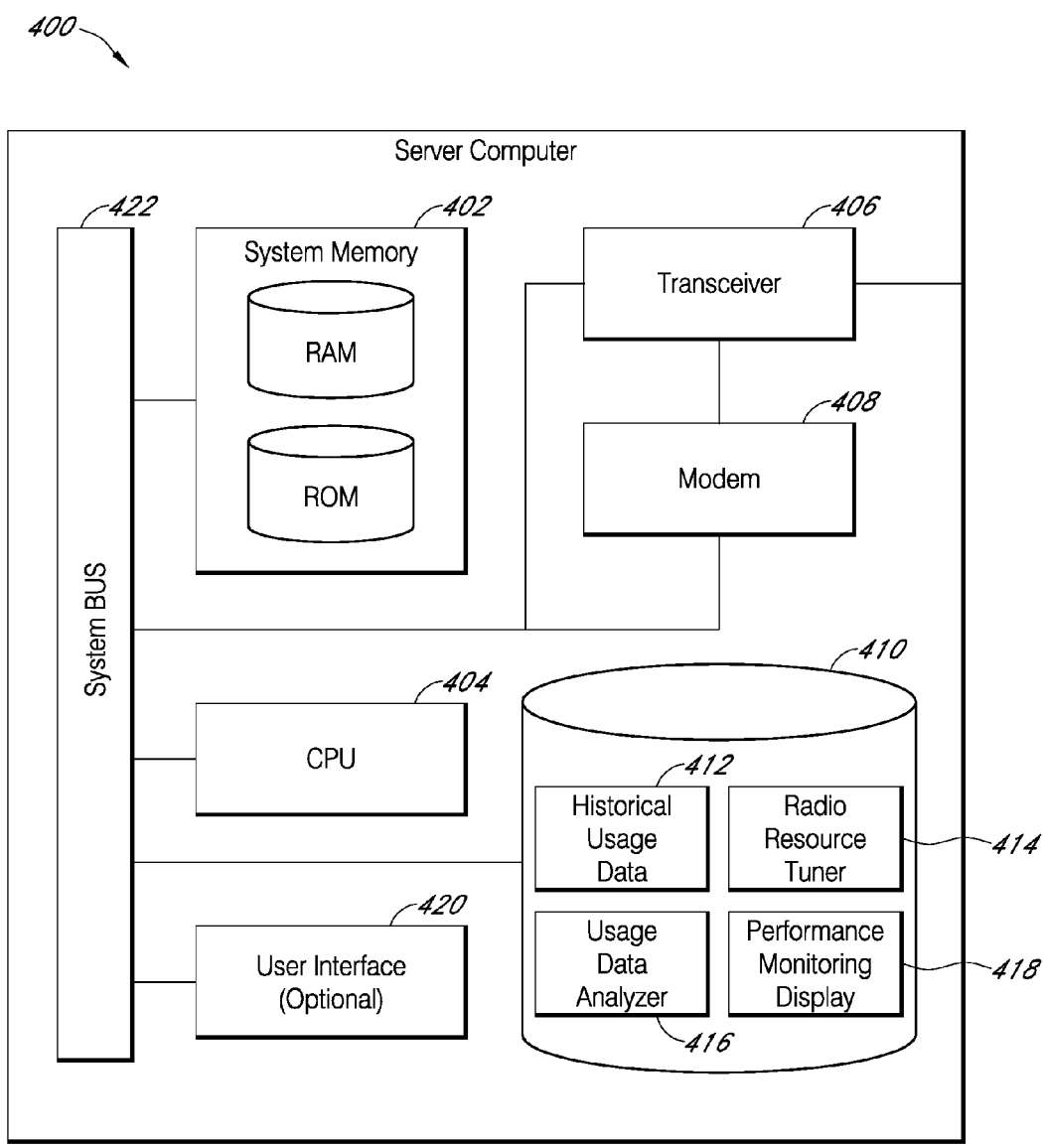
FIG. 4 illustrates a block diagram view of a server computer in accordance with an embodiment of the present invention.
Figure 5:
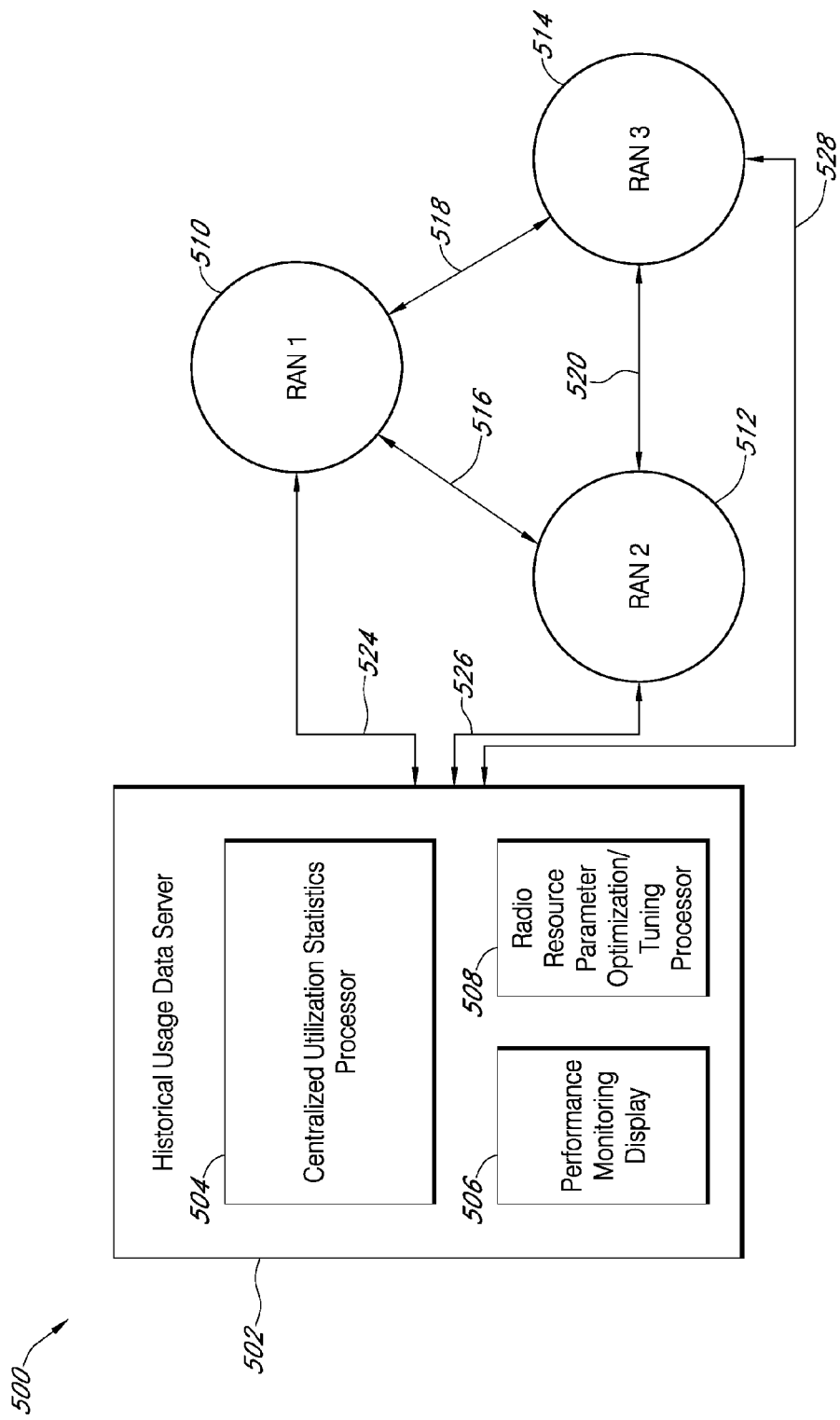
FIG. 5 illustrates a block diagram view of a historical usage data server, base stations, and communications paths between the server and base stations in accordance with an embodiment of the present invention.

FIG. 4 illustrates a block diagram view of a server computer 400 that may be representative of any of the remote service provider devices 204a-c or the base station 206a in FIG. 2, the historical usage data server 502 in FIG. 5, or any other common network device known in the art such as a router, gateway, or switch device. The server computer 400 may include, but is not limited to, one or more processor devices including a central processing unit (CPU) 404. In an embodiment, the CPU 404 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 404 is responsible for executing all computer programs stored on the server computer's 400 volatile (RAM), nonvolatile (ROM), and long-term storage system memories, 402 and 410.

The server computer 400 may also include, but is not limited to, an optional user interface 420 that allows a server administrator to interact with the server computer's 400 software and hardware resources; a software/database repository 410 including: historical usage data 412 that may include a listing of registered transceiver devices (e.g., any of 102a, 104a, 106a, 108a, 206a, and 216a) as well as their usage pattern metrics; a usage data analyzer 416 that analyzes the historical usage data 412; a radio resource tuner 414 for generating a frequency resource allocation plan; and a performance monitoring display 418 for displaying to administrators at a network operations center, for example, the performance and operation of the networked computing system 200. Further, the server computer 400 may also include a modem 408 for formatting data communications prior to transfer; a transceiver 406 for transmitting and receiving network communications amongst various network base stations, user equipment, and computing devices utilizing the data communication network 202 of the networked computing system 200; and a system bus 422 that facilitates data communications amongst all the hardware resources of the server computer 400. An embodiment of the server computer 400 is seen as the historical usage data server 502 in FIG. 5.

FIG. 5 illustrates a networked computing system 500 including a historical usage data server, base stations, and various communications paths in accordance with an embodiment of the present invention. The historical usage data server 502 may be representative of the server computer 400 in FIG. 4 or of any of the remote service provider devices 204a-c in FIG. 2. The radio access networks 510, 512, and 514 may be representative of any of the base station devices 102a, 104a, 106a, 108a, 206a, 216a, and 300. Radio access nodes 510, 512, and 514 may communicate over a suitable peer-to-peer radio access link 516, 518, and 520 (e.g., the X2 neighbor cell peer-to-peer links defined in the 3GPP LTE standard). Radio access nodes 510, 512, and 514 may communicate with the historical usage data server 502 via communication paths 524, 526 and 528 (e.g., the S1 interface defined in the 3GPP LTE standard). Turning to the historical usage data server 502, the server includes, but is not limited to: a centralized utilization statistics processor 504 that analyzes historical usage data; a performance monitoring display 506 for displaying performance to administrators at a network operations center; and a radio resource parameter optimization/tuning processor 508 for generating a frequency resource allocation plan. As will be discussed next, each radio access node 510, 512, and 514 may track historical usage data, share usage data among other radio access nodes and the historical usage data server 502, allocate frequency resources, and implement a frequency allocation plan.

Figure 6:
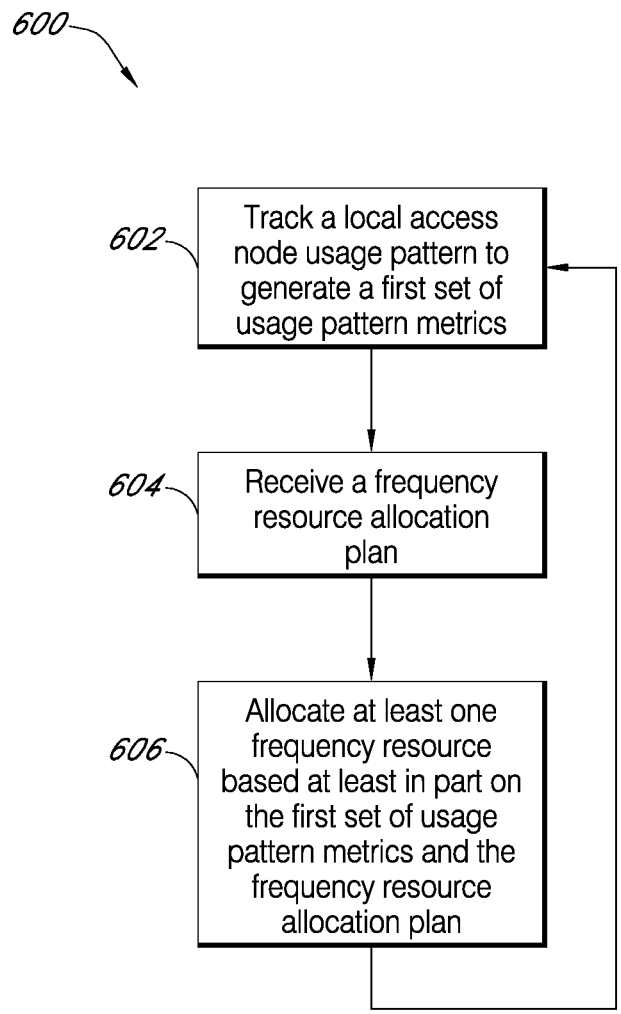
FIG. 6 illustrates a flow diagram depicting processes for allocating a frequency resource in accordance with an embodiment of the present invention.

FIG. 6 illustrates a flow diagram 600 depicting processes for allocating a frequency resource in accordance with an embodiment of the present invention. It should be understood that this process 600 could be executed using one or more computer-executable programs stored on one or more computer-readable media located on any one of the base station devices (e.g., 104a, 106a, 108a, 216a, 300, 510, 512, and 514), or collaboratively on the network base station 102a or 206a, the group of remote service provider devices 204a-c, the server computers 400 and 502, or on any other common service provider device known in the Art of FIGS. 1-5. Additionally, this process could be happening concurrently at multiple locations as would be apparent to a person of ordinary skill in the Art. Initially, a subscriber device (e.g., 208a-c, 218, 220, and 222) begins communicating with a base station (e.g., 104a, 106a, 108a, 216a, 300, 510, 512, and 514). At block 602 the base station of interest (e.g., 510) tracks a local access node usage pattern to generate a first set of usage pattern metrics. In this example, base station 510 would monitor its own communications with various subscriber devices. The base station tracks usage patterns over time to establish metrics such as, but not limited to: daily peak and mean usage times; periods of relatively low utilization; typical mean and peak channel data bandwidth utilization per session; typical mean and peak number of simultaneous active sessions; session timing; session duration; cell handoffs; data traffic patterns; dropped calls as a function of time; and channel interference (e.g., signal-to-interference-plus-noise (SINR) levels). The usage pattern metrics may include a sliding window average and peak hold of any of the usage metrics. In one embodiment of the invention, the tracked information would be non-personalized information so that no privacy issues would arise. In another embodiment, the tracked information may include information specific to a device and its associated user.

Next, at block 604 the base station 510 receives a frequency resource allocation plan. This frequency resource allocation plan may allocate various channels at a variety of times based upon historical usage data. There are several ways the base station 510 may receive this plan, including, but not limited to: generating the allocation plan at the base station 510 based upon information relating to other neighboring base stations (e.g., 512 and 514); receiving the allocation plan from a neighboring base station; and receiving the allocation plan from a server computer (e.g., 502). The frequency resource allocation plan may depend on the inputs to the plan and for what purpose it was generated, but in general the frequency allocation plan may include, but is not limited to: preferred channel lists; preferred channel transmission power; preferred resource block sizes; predicting probability of cochannel interference base on historical usage metrics (e.g. predicting and/or allocating certain high quality (low interference) channels to certain nodes at certain times of day based on past utilization); and identification of a preferred radio access service node (e.g., identifying/allocating resources to a node most capable of facilitating handovers at a certain time based on past utilization).

At block 606, the base station 510 may allocate at least one frequency resource based at least in part on the first set of usage pattern metrics and the frequency resource allocation plan. This step may involve allocating a channel for use by the base station 510 or releasing the channel based upon historical usage data. Further, step 606 may involve varying an output power of the base station 510, etc. This step may happen automatically and dynamically at any time interval or triggered by any event, or this step may occur with manual user intervention. Whatever trigger, the allocation of resources is based in part on the actual usage information by the base station in a network.

Figure 7:
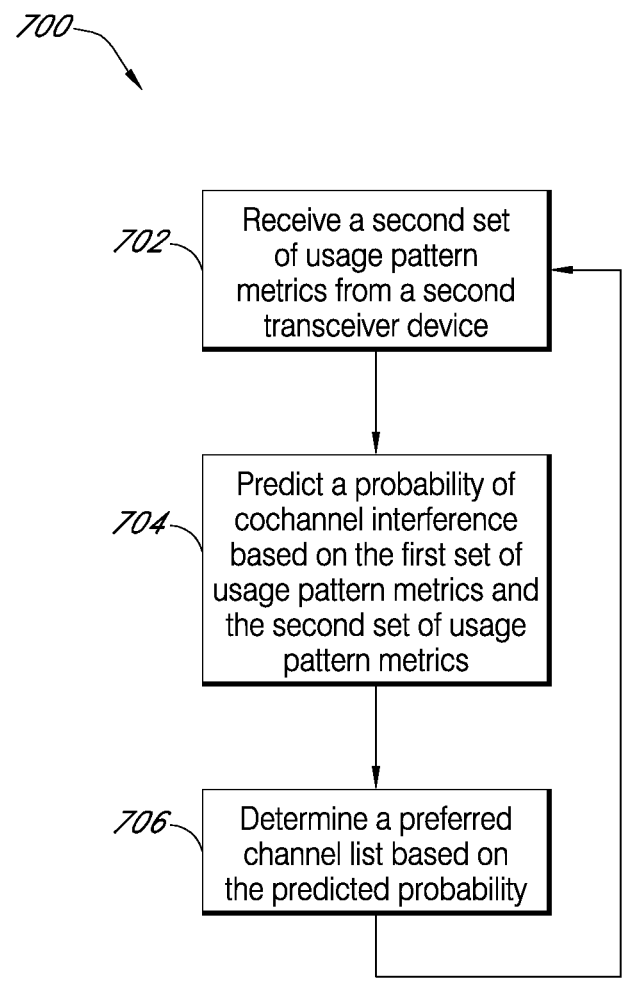
FIG. 7 illustrates a flow diagram depicting processes for determining a preferred channel list based on a predicted probability in accordance with an embodiment of the present invention.

FIG. 7 illustrates a flow diagram 700 depicting processes for determining a preferred channel list based on a predicted probability in accordance with an embodiment of the present invention. Again, it should be understood that this process 700 could be executed using one or more computer-executable programs stored on one or more computer-readable media located on any one of the base station devices (e.g., 104a, 106a, 108a, 216a, 300, 510, 512, and 514), or collaboratively on the network base station 102a or 206a, the group of remote service provider devices 204a-c, the server computers 400 and 502, or on any other common service provider device known in the Art of FIGS. 1-5. Additionally, this process could be happening concurrently at multiple locations as would be apparent to a person of ordinary skill in the Art. By way of example, in block 702 base station 510 receives a second set of usage pattern metrics from a second transceiver device (e.g., 512 and 514). Base station 510 may receive this second set of usage pattern metrics from base station 512 over the peer-to-peer communication network 516. Sharing of usage pattern metrics in this manner facilitates efficient allocation of limited radio resources (e.g., radio bearer channels) by using historical usage patterns to predict future usage needs. Additionally, sharing usage pattern metrics allows the base stations 510 and 512 to coordinate their frequency allocations to reduce the probability of cochannel interference.

After receiving the second set of usage pattern metrics from a second transceiver device 512 in block 702, the first base station 510 may predict in block 704 a probability of cochannel interference based on the first set of usage pattern metrics (e.g., generated in block 602 of FIG. 6) and the second set of usage pattern metrics. Following the prediction in block 704, in block 706 the base station may determine a preferred channel list based on the predicted probability. The base station may then allocate frequency resources based upon the preferred channel list determined in block 706.

Figure 8:
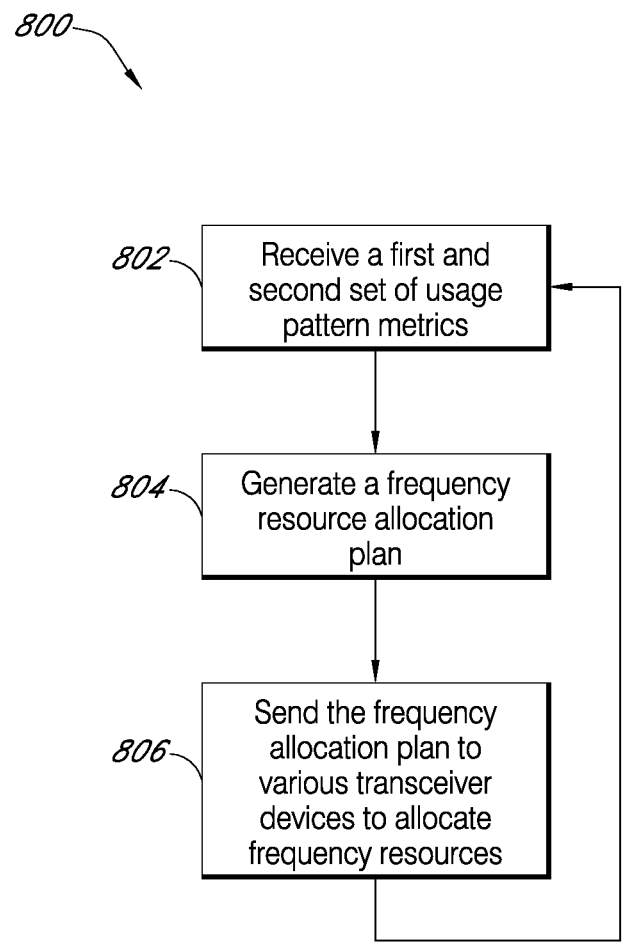
FIG. 8 illustrates a flow diagram depicting processes for generating and distributing a frequency resource allocation plan in accordance with an embodiment of the present invention.

FIG. 8 illustrates a flow diagram 800 depicting processes for generating and distributing a frequency resource allocation plan in accordance with an embodiment of the present invention. Again, it should be understood that this process 800 could be executed using one or more computer-executable programs stored on one or more computer-readable media located on any one of the base station devices (e.g., 104a, 106a, 108a, 216a, 300, 510, 512, and 514), or collaboratively on the network base station 102a or 206a, the group of remote service provider devices 204a-c, the server computers 400 and 502, or on any other common service provider device known in the Art of FIGS. 1-5. By way of example, server computer 502 begins process 800 at block 802 by receiving a first and second set of usage pattern metrics. As would be understood by a person of ordinary skill in the Art, base stations 510 and 512 may each be running process 602 to generate a set of usage pattern metrics. Once the server computer 502 has received the usage pattern metrics, the process moves to block 804 where a frequency resource allocation plan is generated. As described above in relation to process 600, a frequency resource allocation plan may include, but is not limited to: preferred channel lists; preferred channel transmission power; preferred resource block sizes; predicting probability of cochannel interference base on historical usage metrics (e.g. predicting and/or allocating certain high quality (low interference) channels to certain nodes at certain times of day based on past utilization); and identification of a preferred radio access service node (e.g., identifying/allocating resources to a node most capable of facilitating handovers at a certain time base on past utilization).

Further, generating a frequency resource allocation plan may include, but is not limited to: identifying temporal system "hot spots" (i.e., transient network capacity problem areas); and deployment of additional access nodes or additional dedication radio measures to resolve temporal hot spot issues. An example of where deployment of additional may be necessary might be at a sporting event, a parade, or the opening of a new shopping center where existing resources are overwhelmed by traffic.

At block 806 the generated frequency resource allocation plan is sent or distributed to various receiver devices to facilitate the allocation of frequency resources. If server computer 502 has compiled all or a large share of the historical usage pattern metrics, the frequency allocation plan will reflect an optimized frequency resource allocation. Devices that receive the frequency allocation plan may implement the plan in accordance with its instructions (e.g., block 604 and 606).

Figure 9:
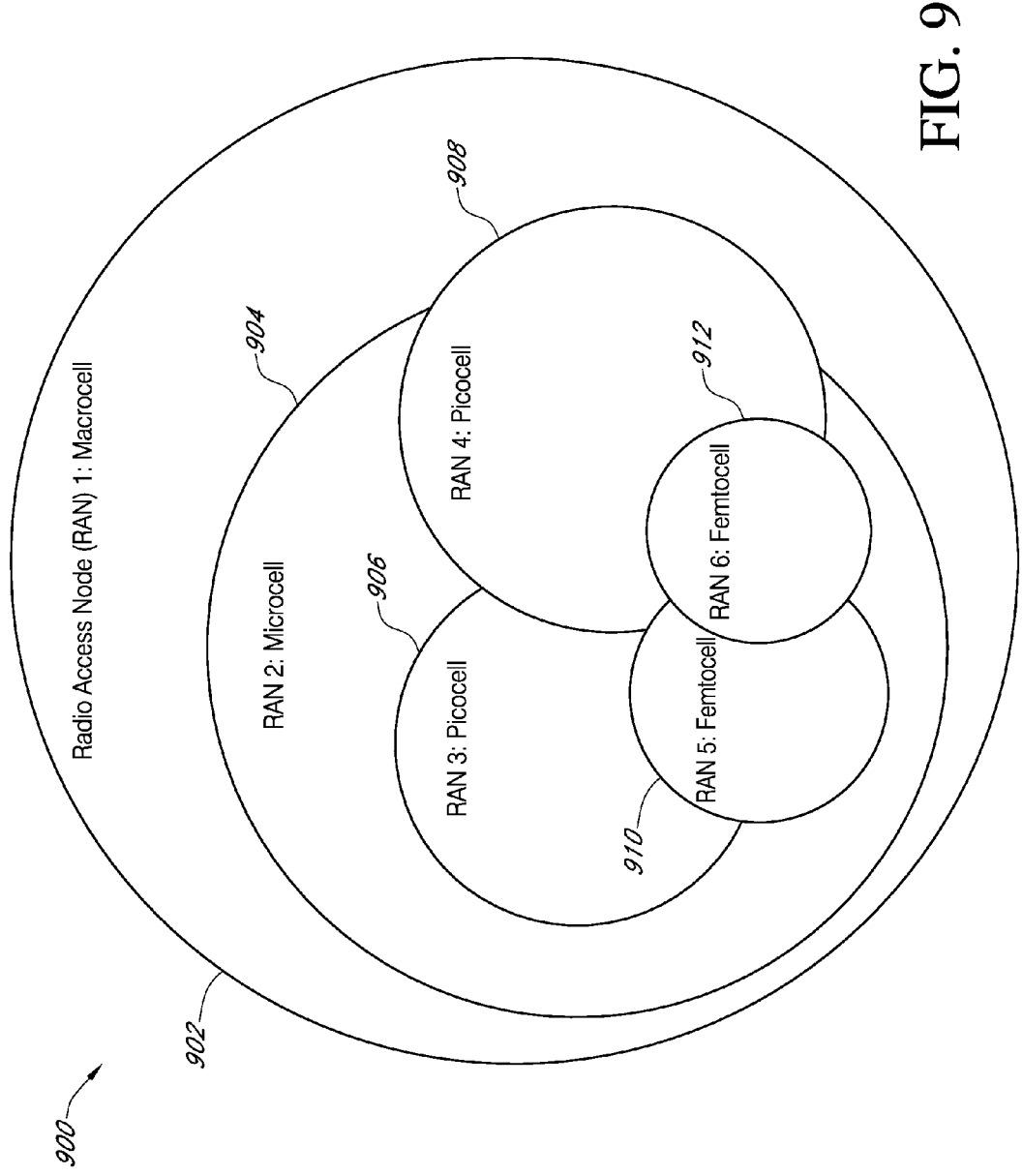
FIG. 9 illustrates macrocell, microcell, picocell and femtocell coverage regions resulting from extemporaneous deployment methodology in accordance with an embodiment of the present invention.

After having described the system and method generally, the systems and methods will be described by way of example. First, FIG. 9 illustrates a system 900 showing macrocell, microcell, picocell and femtocell coverage regions resulting from extemporaneous deployment methodology in accordance with an embodiment of the present invention. A macrocell in system 900 is referenced as Radio Access Node (RAN) 902. This radio access node may also be referred to as RAN 1 (e.g., as in FIG. 10). RAN 902 provides regional coverage and may exhibit statistical uniform temporal loading with loading peaks during commute hours and during weekend events. Next, microcell 904 (i.e., RAN 2) resides within macrocell 902. In one embodiment, RAN 904 is an outdoor urban microcell that is busy during the workweek in the morning, at noontime, and evening hours, as well as during weekend events. RAN 904 may be idle during the midday and non-event weekends. Next, RAN 906 and 908 (i.e., RAN 3 and 4, respectively) may be indoor small-business picocells with busy hours during the workweek but remaining idle over the weekends. Further, RAN 910 and 912 (i.e., RAN 5 and 6, respectively) may be indoor home femtocells busy in the evenings and on weekends while remaining idle during the weekday work hours. Of course, system 900 may include any number macrocells, microcells, picocells, and femtocells exhibiting a wide variety of historical usage patterns.

Figure 10:
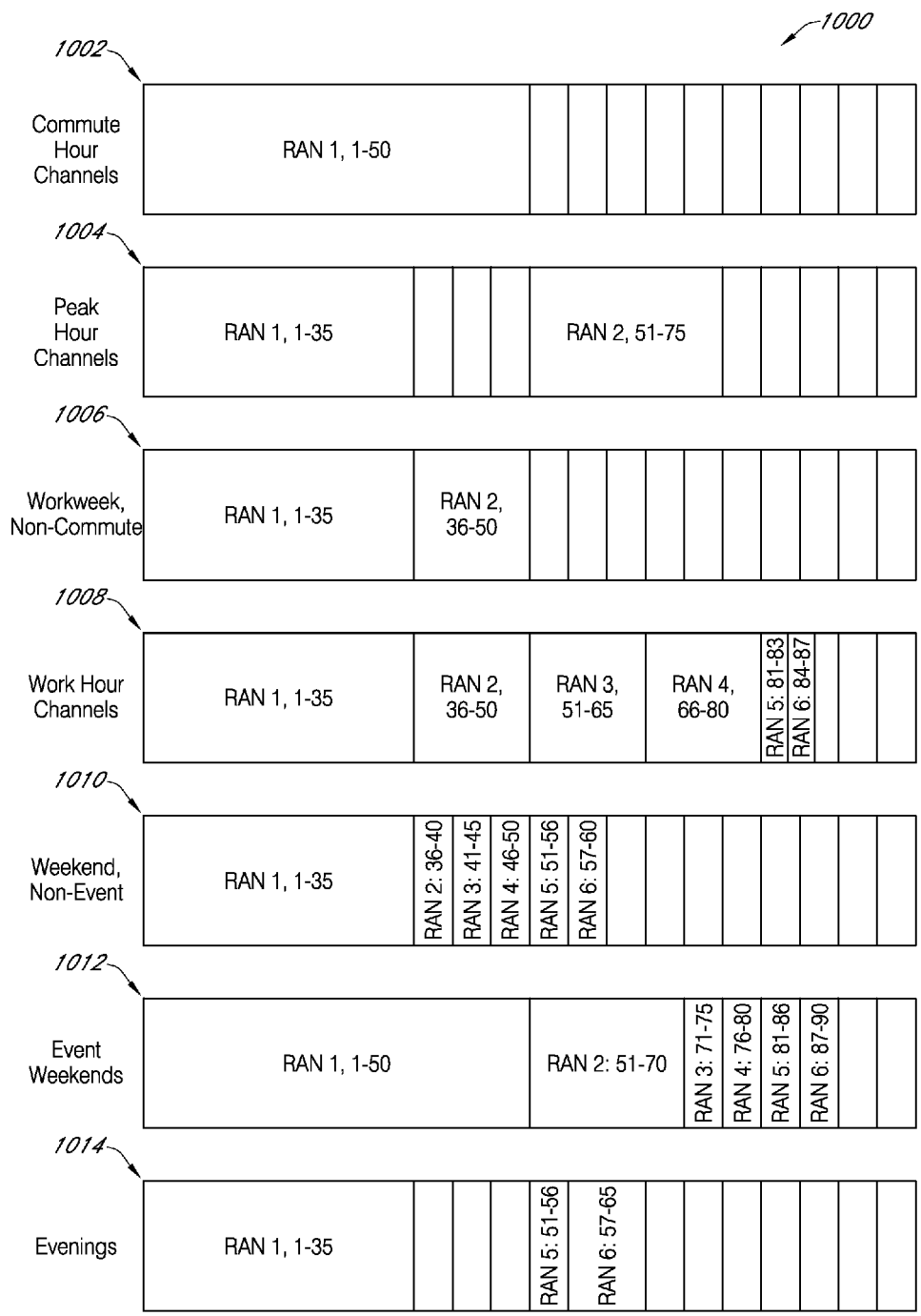
FIG. 10 illustrates a historical usage based frequency resource allocation plan in accordance with an embodiment of the present invention.

FIG. 10 illustrates a historical usage based frequency resource allocation plan 1000 in accordance with an embodiment of the present invention. The plan 1000 is based upon the system 900 described in FIG. 9. The radio access nodes in FIG. 9 (e.g., RAN 1, RAN 2, ..., RAN 6) correspond to the radio access nodes in FIG. 10. In one embodiment, the plan 1000 may be generated by the server computer 502 at block 804. Although plan 1000 shows only seven usage scenarios, it may be understood that any number of scenarios is contemplated by the present invention. Those usage scenarios include, but are not limited to: commute hour channels 1002; peak hour channels 1004; workweek, non-commute channels 1006; work hour channels 1008; weekend, non-event channels 1010; event weekend channels 1012; and evening channel allocation 1014.

In one embodiment, there are a finite number of common shared channels (e.g., channels 1-100) and the frequency resource allocation plan must allocate all the channels to reflect the actual historical usage by the radio access nodes in the system 900. By way of example, historical usage pattern information may be used to generate a frequency resource allocation plan for system 900 during the working hours. This scenario is shown as work hour channels 1008. In this example, RAN 1 is nominally allocated channels 1-35 (i.e., RAN 1 is always allocated at least channels 1-35 because it is a macrocell). RAN 2 may be allocated channels 36-50, RAN 3 may be allocated channels 61-65, and RAN 4 may be allocated channels 66-80. Each allocation of frequency resources reflects a historical usage pattern by the respective radio access node during work hours. In this example, RAN 5 would be allocated only channels 81-83, and RAN 6 would be allocated channels 84-87 to reflect the historical pattern that users are at work rather than using a femtocell at home during this time period. Channels 88-100 are retained as shared "first come, first serve" resources which allows for non-typical resource utilization.

If usage patterns vary over time and a particular access node repeatedly relies on the pool of unallocated resources, then the usage history will also change over time resulting in a varying allocation of preferred resources. For example, a small business utilizing RAN 3 (i.e., indoor small business picocell radio access node 906) may be allocated channels 51-65 during work hours. If the business hires more workers, the number of subscriber devices attempting to communicate with RAN 3 may increase, altering the usage patterns. Over time, the frequency allocation resource plan would reflect this increase, and RAN 3 may be allocated channels 51-70, for example, to accommodate the increase in traffic. Conversely, if a radio access node with allocated channels were removed from the system, the allocated resources would return to the unallocated pool to be utilized by the surrounding cells over time in an opportunistic manner.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

What is claimed is:

1. A networked computing system utilizing historical usage information for optimizing communications resources, comprising:
   a first transceiver device;
   a second transceiver device;
   at least one user equipment;
   a server computer; and
   a data communications network facilitating data communication amongst the first transceiver device, the second transceiver device, the at least one user equipment, and the server computer,
   wherein the first transceiver device is configured to:
   track a local access node usage pattern to generate a first set of usage pattern metrics;
   receive a frequency resource allocation plan;
   allocate at least one frequency resource based at least in part on the first set of usage pattern metrics and the frequency resource allocation plan;
   receive a second set of usage pattern metrics from the second transceiver device;
   predict a probability of cochannel interference based on the first set of usage pattern metrics and the second set of usage pattern metrics; and
   determine a preferred channel list based on the predicted probability.

2. The networked computing system of claim 1, wherein the first transceiver device is further configured to share the first set of usage pattern metrics with the second transceiver device and with the server computer.

3. The networked computing system of claim 1, wherein the server computer is configured to generate the frequency resource allocation plan based on historical usage data received from the first transceiver device and the second transceiver device.

4. The networked computing system of claim 1, wherein the first set of usage pattern metrics is selected from the group consisting of:
   daily peak and mean usage times;
   typical mean and peak channel data bandwidth utilization per session; and
   typical mean and peak number of simultaneous active sessions.

5. The networked computing system of claim 1, wherein the frequency resource allocation plan is generated dynamically based on actual historical usage patterns of the first transceiver device and the second transceiver device.

6. The networked computing system of claim 1, wherein the first transceiver device is selected from the group of a microcell, a picocell, and a femtocell, and wherein the second transceiver device is selected from the group of a macrocell, a microcell, a picocell, and a femtocell.

7. A computer-implemented method for allocating at least one frequency resource based on historical usage data, the method comprising:
   tracking a local access node usage pattern to generate a first set of usage pattern metrics at a first transceiver device in a network;
   receiving a frequency resource allocation plan;
   allocating the at least one frequency resource based at least in part on the first set of usage pattern metrics and the frequency resource allocation plan;
   receiving at the first transceiver device a second set of usage pattern metrics from a second transceiver device;
   predicting a probability of cochannel interference based on the first set of usage pattern metrics and the second set of usage pattern metrics; and
   determining a preferred channel list based on the predicted probability.

8. The computer-implemented method of claim 7, further comprising sharing the first set of usage pattern metrics with a second transceiver device and with a server computer.

9. The computer-implemented method of claim 7, further comprising generating the frequency resource allocation plan based on historical usage data received from the first transceiver device and a second transceiver device at a server computer.

10. The computer-implemented method of claim 7, wherein the first set of usage pattern metrics is selected from the group consisting of:
    daily peak and mean usage times;
    typical mean and peak channel data bandwidth utilization per session; and
    typical mean and peak number of simultaneous active sessions.

11. The computer-implemented method of claim 7, wherein the frequency resource allocation plan is generated dynamically based on actual historical usage patterns of the first transceiver device and a second transceiver device.

12. A non-transitory computer-readable medium comprising computer-executable instructions for allocating at least one frequency resource based on historical usage data, which when executed, performs the method comprising:
    tracking a local access node usage pattern to generate a first set of usage pattern metrics at a first transceiver device in a network;
    receiving a frequency resource allocation plan;
    allocating the at least one frequency resource based at least in part on the first set of usage pattern metrics and the frequency resource allocation plan;
    receiving at the first transceiver device a second set of usage pattern metrics from a second transceiver device;
    predicting a probability of cochannel interference based on the first set of usage pattern metrics and the second set of usage pattern metrics; and
    determining a preferred channel list based on the predicted probability.

13. The non-transitory computer-readable medium of claim 12, further comprising sharing the first set of usage pattern metrics with a second transceiver device and with a server computer.

14. The non-transitory computer-readable medium of claim 12, further comprising generating the frequency resource allocation plan based on historical usage data received from the first transceiver device and a second transceiver device at a server computer.

15. The non-transitory computer-readable medium of claim 12, wherein the first set of usage pattern metrics is selected from the group consisting of:
    daily peak and mean usage times;
    typical mean and peak channel data bandwidth utilization per session; and
    typical mean and peak number of simultaneous active sessions.

16. The non-transitory computer-readable medium of claim 12, wherein the frequency resource allocation plan is generated dynamically based on actual historical usage patterns of the first transceiver device and a second transceiver device.

17. A transceiver device for utilizing historical usage information for optimizing communications resources, comprising:
    at least one memory;
    at least one processor operatively coupled to the memory, wherein the transceiver device is configured to:
      track a local access node usage pattern to generate a first set of usage pattern metrics;
      receive a frequency resource allocation plan;
      allocate at least one frequency resource based at least in part on the first set of usage pattern metrics and the frequency resource allocation plan;
      receiving at the first transceiver device a second set of usage pattern metrics from a second transceiver device;
      predicting a probability of cochannel interference based on the first set of usage pattern metrics and the second set of usage pattern metrics; and
      determining a preferred channel list based on the predicted probability.

* * * * *